United States Patent Office 3,502,622
Patented Mar. 24, 1970

3,502,622
**METHOD FOR THE CONTINUOUS PRODUC-
TION OF HIGH POLYMERIC POLYESTERS
AND MIXED POLYESTERS**
Gottfried G. E. K. Reichel, Premnitz, Kreis, Rathenow,
Lothar E. H. Sass, Rathenow, Kreis, Rathenow, and
Andreas E. P. Labahn, Premnitz, Kreis, Rathenow,
Germany, assignors to VEB Chemiefaserwerk "Fried-
rich Engels," Rathenow, Germany
No Drawing. Filed Feb. 8, 1968, Ser. No. 703,900
Int. Cl. C08g 20/17
US Cl 260—75
5 Claims

ABSTRACT OF THE DISCLOSURE

In the production of high molecular weight polyesters and mixed polyesters involving monomer production by esterification of a dicarboxylic acid or transesterification of a dicarboxylic acid ester with a bi- or higher polyfunctional alcohol followed by preliminary condensation and polycondensation, an improved method of maintaining the viscosity of the final product within predetermined limits is provided. This method involves carrying out the preliminary condensation to an excess degree to result in an excess viscosity of the preliminary condensation product and then lowering the viscosity of the preliminary condensation product to a predetermined value by introducing into the preliminary condensation stage either a bi- or higher polyfunctional alcohol or a solvent which is readily vaporizable under the conditions of the polycondensation.

This invention relates to a method for the continuous production of high polymeric polyesters and mixed polyesters from an alkyl ester of a dicarboxylic acid having two like alkyl substituents or a mixed ester of a dicarboxylic acid (i.e., having two different alkyl substituents) of a mono-alkyl ester of a dicarboxylic acid or a dicarboxylic acid, in which after the transesterification (ester interchange) or esterification of the foregoing compounds with ethylene glycol or another bi- or higher polyfunctional alcohol, the product of the transesterification or esterification is preliminarily condensed and then in a subsequent stage polycondensed.

It is known to carry out the continuous production of polyethylene terephthalate in a plurality of stages. In the first stage, the reactants, for example, ethylene glycol and dimethylterephthalate are fed through a metering device with a known catalyst into a transesterification column and undergo transesterification to form diglycolterephthalate.

In the second stage, the monomeric product thus obtained is fed (through a metering device) into a preliminary condensation apparatus in which, accompanied by the vaporization of ethylene glycol, preliminary condensation to lower molecular weight condensation products takes place. Finally, as the third stage, the preliminary condensation product is continuously fed into a polycondensation apparatus and, accompanied by the further vaporization of ethylene glycol, polycondensed. The thus obtained polyethylene terephthalate is continuously fed out of the polycondensation apparatus, for example by means of a pressure screw, to, for example, spinnerets for the production of filaments, pumps, if necessary, being located between the polycondensation apparatus outlet and the spinnerets to assist the flow of the polyethylene terephthalate. Other linear high polymeric polyesters, for example, those based on adipic acid, are similarly produced.

In order to obtain a final product of constant melt viscosity, the melt viscosity of the polyester is determined by means of known measuring apparatus after it has been fed out of the polycondensation apparatus. The means for metering reactants into the transesterification column is controlled by the viscosity measuring apparatus, whereby if the viscosity falls outside of predetermined limits the metering apparatus is caused to change the rate of feed of reactants to the transesterification column. Accordingly, with the other reaction parameters, such as pressure and temperature, maintained constant, the melt viscosity of the final product is controlled to remain essentially constant, i.e., between predetermined limits, simply by changing the rate of feedthrough of reactants in the transesterification column.

It is also known to maintain the melt viscosity of the final product constant by measuring the viscosity of the preliminary condensation product and controlling the metering means feeding the preliminary condensation product to the polycondensation apparatus whereby the melt viscosity is maintained constant simply by varying the rate of feed of preliminary condensate to the polycondensation apparatus.

Futhermore, it is known that with other parameters (including throughput of reactants) constant, the melt viscosity can be controlled by regulating the reaction temperature. According to that method, a temperature regulating apparatus is controlled by a viscosity measuring apparatus located at the outlet side of the polycondensation apparatus.

Moreover, it is known that the melt viscosity of the final product can be maintained constant by the addition of finely sub-divided oligomeric and/or polymeric products to the monomer, the constitution of which has to be identical with that of the bulk of the mixture, before the monomer is introduced into the preliminary condensation apparatus.

The above-described methods generally have the disadvantage that the time lapses between the measuring of the melt viscosity and the effecting of the change in throughput of reactants or temperature make the process take longer.

The changing of throughput has the further disadvantage that not only is the mass balance of a continuous system disturbed, but, also, the precision with which the end of the reaction can be determined is disturbed. This is especially the case if the control system acts by a rapid series of oscillating variations rather than more exactly. Moreover, by changing the throughput the spinning process is disturbed since the amount of polyester fed thereto is varied.

The regulation of melt viscosity by variations of the temperature in a single reaction stage is dependent on the temperature sensitivity of the materials and is particularly critical in polycondensation processes. At high temperatures a degradation of the polycondensate occurs, a lowering of the temperature causes a solidification of the melt and termination of the reaction and the entire process.

The object of the present invention is to control the viscosity of the polyester product by a method which is an improvement over the known methods, in the known methods the melt viscosity being controlled by changes in the throughput or temperature in a single stage. A further object is to eliminate the disadvantages in the known methods of control.

According to the invention, the viscosity of the end product is controlled without disturbing the mass balance of the components of the reaction system.

This is attained, according to the invention, by continuously measuring the melt viscosity of the preliminary condensation product in a known manner and if the melt viscosity varies to a value outside of the predetermined limits, adding to the preliminary condensation product through a metering device controlled by the viscosity measuring apparatus a bi- or higher polyfunctional alcohol or a solvent which is readily vaporizable under the conditions of the polycondensation. Preferably, the polyfunctional alcohol or solvent is metered into the lower part of the preliminary condensation apparatus.

In accordance with this method, it has been found desirable to initially regulate the degree of condensation in the preliminary condensation to a somewhat higher value than is necessary for the subsequent polycondensation and subsequently to lower it to the desired level.

The advantage of the method of the invention is that the preliminary condensation product is fed into the polycondensation apparatus at a constant mass rate and adjustments in the viscosity of the preliminary condensation product to maintain it at a constant value are effected with an essentially insignificant lapse of time. Control of the viscosity of the preliminary condensation product results in control of the viscosity of the final polyester. Moreover, the method of the invention eliminates undesirable changing in throughput whereby the final product is fed to the spinnerets at a constant rate.

A further advantage is that not only can the polycondensation but also the esterification or transesterification and the preliminary condensation can each be carried out at constant optimum conditions of throughput, temperature and pressure. Moreover, a continuous regulation of temperature as a function of melt viscosity is not necessary so that there can be eliminated costly temperature regulation apparatus provided with automatic means for adjusting the temperature to varying desired values.

Examples of the esters for the production of the high polymeric polyesters are: dimethylterephthalate; diethyladipate; dimethyl - 5 - sulfoisophthalate; dimethyladipate; dimethyloxalate; diethylsuccinate; dimethylisophthalate; methyl-p-oxybenzoate; ethyl-p-oxybenzoate; and dibenzyladipic acid. Examples of acids are the corresponding acids.

Examples of the polyfunctional alcohols for the production of the high polymeric polyesters are: ethylene glycol, glycerine; propanediol - 1,2; propanediol - 1,3; butanediol-1,4; butanediol-1,2; pentanediol-1,5; pentanediol-1,4; hexanediol-1,6; and 1,4-dimethylolcyclohexane.

Examples of the polyfunctional alcohols for the lowering of the viscosity of the preliminary condensates are: ethylene glycol, glycerine; propanediol-1,3; butanediol-1,4; butanediol-1,2; pentanediol-1,5; hexanediol-1,6; and 1,4-dimethylolcyclohexane.

Examples of the solvents for the lowering of the viscosity are diphenyl and 4-chlorodiphenyl.

The invention will now be further described by reference to the following examples which are intended, however, to be illustrative rather than restrictive.

EXAMPLE 1

A solution of 1 mol of dimethylterephthalate and 2.3 mols of ethylene glycol is fed at a constant mass rate by means of a conventional metering device into a conventionally operated transesterification column. The thus obtained monomeric product is led through another conventional metering device into a conventional preliminary condensation apparatus in which the preliminary condensation is carried out until there is obtained a preliminary condensation product which has a melt viscosity higher than that necessary for the subsequent polycondensation. The melt viscosity corresponds to a solution viscosity $\eta_{rel.}$ of about 1.18. The preliminary condensation product thus obtained is fed to a conventional polycondensation apparatus. While the preliminary condensation product is being fed into the polycondensation apparatus, the melt viscosity is continuously measured by means of conventional apparatus. The predetermined desired value of $\eta_{rel.}$ for the preliminary condensation product is 1.12. Thus, the value 1.18 is excessive and, accordingly, a signal is transmitted from the viscosity measuring apparatus to a metering means in a line between a storage vessel and the bottom basin of the preliminary condensation apparatus. The storage container contains ethylene glycol maintained at a temperature of about 100° C. Activation of the metering means by this signal from the viscosity measuring apparatus causes ethylene glycol to be metered into the bottom basin of the preliminary condensation apparatus. This metering in continues until the relative viscosity of the preliminary condensation product issuing from the preliminary condensation apparatus is lowered to the desired value of 1.12. The resultant slight excess of ethylene glycol is distilled off in the polycondensation apparatus. The polyethylene terephthalate obtained by means of the polycondensation is fed directly to spinnerets for the production of fibers.

EXAMPLE 2

1 mol of diethyladipate and 2.5 mols of glycerine are subjected to transesterification followed by preliminary condensation of the resultant monomer, by the procedure described in Example 1. Preliminary condensation is allowed to take place to such a degree that the viscosity of the preliminary condensation product is at a level higher than desired and, accordingly, by the procedure described in Example 1, glycerine is introduced into the preliminary condensation column until the viscosity of the preliminary condensate is lowered to the desired value.

EXAMPLE 3

Exactly the same procedure as in Example 1 is carried out but with 1 mol of terephthalic acid and 2.8 mols of ethylene glycol as the initial reactant, and with the use of diphenyl heated to about 120° C. introduced into the preliminary condensation column to lower the viscosity of the preliminary condensate.

EXAMPLE 4

Exactly the same procedure as in Example 1 is carried out but with 0.8 mols of dimethylterephthalate and 0.2 mol of 5-sulfo-dimethylisophthalate dissolved in 2.1 mols of ethylene glycol as the initial reactants.

What is claimed is:

1. In a method for the continuous production of high polymers of the group consisting of polyesters and mixed polyesters from at least one substance of the group consisting of dialkyl esters of dicarboxylic acids, mixed alkyl esters of dicarboxylic acids and dicarboxylic acids, said method comprising reacting said substance with at least one polyfunctional alcohol and in separate stages preliminary condensing the resultant reaction product to a low molecular weight preliminary condensate and subsequently polycondensing said low molecular weight preliminary condensate to form the desired high polymer, the improvement comprising maintaining the viscosity of the high polymer final product within predetermined limits by carrying out the preliminary condensation to a degree in excess of that required for the polycondensate whereby the preliminary condensate has a higher than desired viscosity, continuously measuring the viscosity of the preliminary condensate whereby said higher than desired viscosity is detected, and in response to said detecting introducing into the preliminary condensation stage a material of the group consisting of polyfunctional alcohols and solvents which are readily vaporizable under the conditions of the polycondensation said solvent being diphenyl or 4-chlorodiphenyl until the viscosity of the preliminary condensate is lowered to the desired value.

2. A method according to claim 1, in which said substance is dimethylterephthalate and the polyfunctional alcohol reacted with the dimethylterephthalate is ethylene glycol, ethylene glycol also being a polyfunctional alcohol which is introduced into the preliminary condensation stage to lower the viscosity of the preliminary condensate.

3. A method according to claim 1, in which said substance is diethyladipate and the polyfunctional alcohol reacted with the diethyladipate is glycerine, glycerine also being a polyfunctional alcohol which is introduced into the preliminary condensation stage to lower the viscosity of the preliminary condensate.

4. A method according to claim 1, in which said substance is terephthalic acid, the polyfunctional alcohol reacted with the terephthalic acid is ethylene glycol and the material introduced into the preliminary condensation stage to lower the viscosity of the preliminary condensate is diphenyl.

5. A method according to claim 1, in which said substance is terephthalic acid and 5-sulfo-isoterephthalate together and said polyfunctional alcohol is ethylene glycol, ethylene glycol also being a polyfunctional alcohol which is introduced into the preliminary condensation stage.

References Cited

UNITED STATES PATENTS

| 2,933,476 | 4/1960 | Fisher | 260—75 |
| 3,245,955 | 4/1966 | Rieber | 260—75 |

FOREIGN PATENTS 1,125,258  8/1968  Great Britain.

OTHER REFERENCES

Cecchini, Det. Pub. of Ser. No. 723,407 filed Apr. 23, 1968, published in 861 O.G. 17, Apr. 1, 1969, class 117, subclass 92.

WILLIAM H. SHORT, Primary Examiner

M. GOLDSTEIN, Assistant Examiner